United States Patent [19]

Dickie et al.

[11] Patent Number: 4,639,493

[45] Date of Patent: Jan. 27, 1987

[54] CONJUGATED DIENE FUNCTIONAL MODIFIED AMINOEPOXY RESINS

[75] Inventors: Ray A. Dickie, Birmingham; Saiyed B. A. Qaderi, Livonia, both of Mich.

[73] Assignee: Ford Motor Company, Dearborn, Mich.

[21] Appl. No.: 679,977

[22] Filed: Dec. 10, 1984

[51] Int. Cl.$^4$ .............................................. C08L 63/10
[52] U.S. Cl. .................................... 525/113; 525/122; 525/529; 525/530; 525/502
[58] Field of Search ............... 525/113, 122, 529, 530, 525/502

[56] References Cited

U.S. PATENT DOCUMENTS

| | | |
|---|---|---|
| 2,065,126 | 12/1936 | Echberg . |
| 2,731,450 | 1/1956 | Serniuk . |
| 3,012,984 | 12/1961 | Hudson . |
| 3,036,041 | 5/1962 | Tarbell . |
| 3,245,954 | 4/1966 | Bergman . |
| 3,373,221 | 3/1968 | May . |
| 3,404,018 | 10/1968 | Hicks . |
| 3,410,926 | 11/1968 | Hicks . |
| 3,478,126 | 11/1969 | Turpin . |
| 3,600,290 | 8/1971 | Fitko . |
| 3,600,459 | 4/1971 | Vasta . |
| 3,670,047 | 6/1972 | Broecker . |
| 3,707,526 | 12/1972 | Gannon et al. . |
| 3,749,758 | 7/1973 | Gannon . |
| 3,804,786 | 4/1974 | Sekmakas . |
| 3,823,107 | 7/1974 | Cotton . |
| 3,922,253 | 11/1975 | Jerabek et al. . |
| 3,947,338 | 3/1976 | Jerabek et al. . |
| 3,962,499 | 8/1976 | Brody et al. . |
| 3,969,300 | 7/1976 | Nagata et al. . |
| 3,996,182 | 12/1976 | Hong et al. . |
| 4,018,848 | 4/1977 | Khanna . |
| 4,036,795 | 7/1977 | Tominaga . |
| 4,036,800 | 7/1977 | Sekmakas et al. . |
| 4,037,018 | 7/1977 | McGinniss . |
| 4,066,525 | 1/1978 | Woo et al. . |
| 4,101,486 | 7/1978 | Bosso et al. . |
| 4,134,865 | 1/1979 | Tominaga . |
| 4,134,866 | 1/1979 | Tominaga et al. . |
| 4,134,932 | 1/1979 | Kempter et al. . |
| 4,145,323 | 3/1979 | Sekmakas et al. . |
| 4,147,676 | 4/1979 | Pampouchidis . |
| 4,164,486 | 8/1979 | Kudo et al. . |
| 4,176,099 | 11/1979 | Pampouchidis et al. . |
| 4,207,222 | 6/1980 | Blum et al. . |
| 4,238,594 | 12/1980 | Pampouchidis . |
| 4,246,151 | 1/1981 | Doby et al. . |
| 4,247,659 | 1/1981 | Sckmakas et al. . |
| 4,253,930 | 3/1981 | Tsuchiya et al. . |
| 4,256,621 | 3/1981 | Shimokai et al. ............... 204/181 C |
| 4,274,989 | 6/1981 | Tominaga et al. . |
| 4,278,580 | 7/1981 | Schmolzer et al. . |
| 4,289,811 | 9/1981 | Shelby, Jr. . |
| 4,293,672 | 10/1981 | Jackson . |
| 4,294,940 | 10/1981 | Hino et al. . |
| 4,296,010 | 10/1981 | Tominaga . |
| 4,356,276 | 10/1982 | Honig et al. . |

OTHER PUBLICATIONS

B. F. Goodrich Co., "Hycar Reactive Liquid Polymers", REG-16949, PB-20, Apr. 1980.

Primary Examiner—John C. Bleutge
Assistant Examiner—Robert E. L. Sellers
Attorney, Agent, or Firm—Peter D. McDermott; Roger L. May

[57] ABSTRACT

Diene functional modified aminoepoxy resins are disclosed, which resins are the reaction product of (i) diepoxide reactant, (ii) amine functional conjugated diene chain extending reactant, (iii) optionally, end-capping reactant such as monohydroxy functional diene, (iv) hydroxy functional secondary amine modifying agent, and (v) certain secondary amine terminated or carboxy terminated butadiene acrylonitrile copolymer modifying agent.

19 Claims, No Drawings

CONJUGATED DIENE FUNCTIONAL MODIFIED AMINOEPOXY RESINS

TECHNICAL FIELD The invention relates to certain diene-functional aminoepoxy resins useful with certain dieneophile-functional aminoepoxy resins, with which they are coreactive at elevated cure temperatures, and to thermosetting compositions of matter comprising such resins. According to certain preferred embodiments, this invention relates to use of such resins in compositions adapted to form corrosion protective coatings.

RELATED APPLICATIONS

This application is related to application Ser. Nos., 565,798, now U.S. Pat. No. 4,559,393, 566,063, now U.S. Pat. No. 4,565,852, and 566,068, now U.S. Pat. No. 4,582,880, each filed Dec. 27, 1983; application Ser. No. 680,112, filed Dec. 10, 1984, entitled CROSSLINKABLE COMPOSITION COMPRISING AMINO EPOXY RESIN-IV; application Ser. No. 680,411, filed Dec. 10, 1984, entitled CROSSLINKABLE COMPOSITION COMPRISING MODIFIED AMINO-EPOXY RESINS - I; application Ser. No. 679,962, filed Dec. 10, 1984, entitled CROSSLINKABLE COMPOSITION COMPRISING MODIFIED AMINO-EPOXY RESINS - II; application Ser. No. 679,975, filed Dec. 10, 1984, entitled BLOCKED DIENEOPHILE FUNCTIONAL MODIFIED AMINO-EPOXY RESINS; and application Ser. No. 679,783, filed Dec. 10, 1984, entitled EPOXYAMINE COMPOSITIONS FOR ELECTRODEPOSITION OF COATINGS ON A SUBSTRATE - I. In addition, the following commonly assigned applications each relate to diene/dieneophile chemistry in compositions suitable for thermosetting coatings and the like: Ser. Nos. 455,678, now U.S. Pat. No. 4,514,548, and 455,718 filed Jan. 1, 1983, now U.S. Pat. No. 4,514,549, Ser. Nos. 456,067, now U.S. Pat. No. 4,515,926, and 456,068 filed Jan. 6, 1983, now U.S. Pat. No. 4,513,125, and Ser. No. 458,119 filed Jan. 14, 1983, now U.S. Pat. No. 4,508,879.

BACKGROUND ART

Coating compositions are known which are suitable for application to a substrate, for example, by spraying, dipping, electrodeposition or the like, which coating compositions are then cured by baking the coated substrate at an elevated temperature. Typically, such coating compositions comprise resinous materials or blends of resinous materials, in some cases together with suitable crosslinking agent reactive with such resinous materials at elevated temperature.

In regard to electrodeposition of coatings, the process is well described in the art. Typically, an aqueous bath containing the coating composition is placed in contact with an electrically conductive anode and an electrically conductive cathode, and upon the passage of electric current (normally direct current) between the anode and the cathode, an adherent film of the coating composition is deposited. Depending upon the nature of the coating composition, the coating may be deposited at the anode or at the cathode. The voltage applied may vary from as low as, for example, one volt to as high as, for example, 500 volts or higher. Typically, however, the voltage used ranges from about 50 to about 400 volts.

A wide variety of electrodepositable resins are known to the skilled of the art. For example, a number of water-soluble, water-dispersible, or water-emulsifiable poly-carboxylic acid resins can be electrodeposited. Some of these resins include, for example, reaction products or adducts of a drying oil or semidrying oil fatty acid ester with a di-carboxylic acid or anhydride; interpolymers of a hydroxyalkyl ester of an unsaturated carboxylic acid, unsaturated carboxylic acid, and at least one other ethylenically unsaturated monomer; alkyd-amine vehicles, that is vehicles containing an alkyd resin and an amine-aldehyde resin; and mixed esters of resinous polyols. In U.S. Pat. No. 3,991,028 to Irwin et al, electrodepositable compositions are disclosed which comprise a water-dispersion of a hydrolyzed polyepoxide in combination with an interpolymer of a hydroxyalkyl ester, an unsaturated acid and at least one other monomer, and an amine-aldehyde resin. The use of a hydrolyzed polyepoxide is said to provide improved properties and to avoid agglomeration of the coating composition. In U.S. Pat. No. 4,026,855 to Parekh et al, a coating composition is disclosed to be adaptable for use in electrodeposition or as a water-based coating for applicatin by spray or dip coating methods. The composition comprises an aqueous dispersion of (A) an ungelled modified crosslinking agent comprising certain aminoplast crosslinking agent modified by reaction with a non-resinous compound containing an hydroxyl-group bearing carboxylic acid, and (B) a water dispersible non-gelled polymeric material carrying a cationic charge and containing at least one class of reactive groups selected from carboxyl groups, alcoholic hydroxy groups and amide groups and also containing amino groups, and (C) an acid solubilizer. In U.S. Pat. No. 4,033,917 to Sekmakas et al, certain copolymers of polyethylenically unsaturated epoxy-amine adducts are disclosed and also stable aqueous dispersions containing same and also the electrodeposition of such aqueous dispersions at the cathode of a unidirectional electrical system. Specifically, amine functional polymers dispersible in water with the aid of a solublizing acid are said to be provided by copolymerizing (A) certain ethylenically unsaturated hydroxy functional amine adduct free of epoxy groups; and (B) copolymerizable monoethylenically unsaturated monomers, a portion of which is amine-functional. The copolymer is said to be stably dispersible in water at certain pH and to be electrodepositable at the cathode, optionally together with an aminoplast curing agent to provide coatings which can be cured, ususally by exposure to elevated temperature. U.S. Pat. No. 3,471,388 to Koral is directed to a cathodic electrocoating composition which incorporates an aminoplast crosslinker (e.g., butylated melamine) with an aminated polymer containing hydroxy groups Numerous suitable hydroxy-containing aminated polymers are suggested which have capability to crosslink with an aminoplast crosslinking agent. One such suggested polymer is the reaction product of a polyfunctional amine with a polyfunctional epoxy compound. The polyhydroxy polymers are said to be dispersable in water upon addition of suitable acid such as acetic acid.

Additional teaching directed to coating compositions suitable for use in electrocoating processes is provide in U.S. Pat. No. 4,159,233 to Tinge et al; U.S. Pat. No. 4,057,523 to Blank; U.S. Pat. No. 4,182,831 to Hicks; U.S. Pat. No. 4,192,932 to Dickie, which patent is assigned to the assignee of the present application; U.S. Pat. No. 4,192,929 to Bloomfield, which patent is assigned to the assignee of the present application; U.S. Pat. No. 4,202,746 to Lee et al; and U.S. Pat. No. 4,072,536 to Otsuki et al.

It is a general objective of the present invention to provide a composition of matter adaptable for use in coating compositions, including compositions adapted for use in solvent-based sprayable coating compositions, compositions adapted for use in electrodeposition coating compositions, and compositions adapted for use in the manufacture of adhesives, molding compounds and textile treating resins and the like. Additional objects and aspects of the present invention will be apparent from the following description thereof.

DISCLOSURE OF THE INVENTION

The present invention provides conjugated diene functional modified aminoepoxy resin of number average molecular weight about 1000–18,000, comprising the reaction product of suitable diepoxide reactant with first reactant comprising chain extending reactant, specifically, amine functional diene, particularly a di-secondary amine functional bis-diene or, more preferably, a mono-primary amine functional diene such as, for example, furfuryl amine or a compatible mixture thereof. The diene functional aminoepoxy resin preferably is end-capped. That is, preferably such first reactant further comprises suitable monofunctional reactant, most preferably monofunctional conjugated diene reactant such as, for example, mono-secondary amine functional conjugated diene, mono-hydroxy functional conjugated diene which is preferred, or any compatible mixture thereof. (Obviously, the term "monofunctional" in this usage is intended to mean only a single functionality substantially reactive with the epoxy functionality resin and is not exclusive of conjugated diene functionality.) End-capping reactants, with which the diepoxide can be reacted either subsequently or simultaneously with the amine functional diene, include, for example, furfuryl alcohol and others which will be apparent to the skilled of the art in view of the present disclosure. Other end-capping reactants which preferably are reacted subsequent to the reaction of the diepoxide with the amine functional diene, for example 2-hydroxymethyl-1,3-butadiene, will also be apparent. Whether the reaction of the diepoxide resin with the amine functional diene would more preferably be carried out prior to or simultaneously with the end-capping reaction will be apparent to the skilled of the art in view of the present disclosure, considering the relative reactivity of the reactants and the desired molecular weight range of the diene functional aminoepoxy resin.

As a characterizing aspect of the invention, the diene functional aminoepoxy resin is modified by reaction with (i) modifying agent comprising hydroxy functional secondary amine, and (ii) second modifying agent comprising certain butadiene acrylonitrile copolymer resins.

The diene functional aminoepoxy resins of the invention are useful in thermosetting compositions with, for example, certain blocked or unblocked dieneophile functional aminoepoxy resins co-reactive at elevated cure temperatures with the diene functional resins. The blocked dieneophile functional aminoepoxy resin is of number average molecular weight about 1000–18,000, comprising the reaction product of suitable diepoxide resin with second reactant comprising chain extending reactant, specifically, amine functional blocked dieneophile, such as di-secondary amine functional bis-blocked dieneophile or, more preferably, mono-primary amine functional blocked dieneophile, or a compatible mixture thereof. Preferably such amine functional blocked dieneophile is a mono-primary amine functional blocked ene, such as, for example, amino maleamic acid. The blocked dieneophile functional aminoepoxy resin preferably is end-capped. That is, preferably such second reactant further comprises suitable monofunctional end-capping reactant as further discussed below. The blocked dieneophile functional aminoepoxy resin may be modified by reaction with (i) the aforesaid modifying agent comprising hydroxy functional secondary amine, (ii) the aforesaid second modifying agent comprising certain butadiene acrylonitrile copolymer resin, or (iii) both, as further discussed below. Preferably both aminoepoxy resins are modified both by the hydroxy functional secondary amine and the butadiene acrylonitrile copolymer.

The two aminoepoxy resins are used preferably in molar ratio of about 1:2 to about 2:1. Most preferably they are used in stoichiometric amounts.

Compositions comprising the diene functional aminoepoxy resins and the dieneophile functional aminoepoxy resins are readily adaptable for use as solvent-based coating compositions or as aqueous-based electrodeposition coating compositions. Coatings provided by such compositions are found to be highly resistant to solvents and humidity and to provide exceptional corrosion protection for the underlying substrate. Also, in using the aminoepoxy resins of the invention in electrocoating applications, the butadiene acrylonitrile copolymer resin second modifying agent is found to increase the upper voltage limits of the bath and, hence, to improve the throwing power of the electrocoat bath. It also improves the corrosion protection provided by the cured coating. The invention also is particularly advantageous in that it provides coatings which cure at relatively low temperature. Diene functional modified aminoepoxy resins according to the invention also may be used in the manufacture of low pressure laminates, adhesives, molding compounds, textile treating resins and the like.

According to a significantly advantageous aspect of the invention, the molecular weight of the aminoepoxy resins is readily controllable to suit their intended use. Thus, for use in a cathodic electrocoating composition, for example, the diene functional aminoepoxy resin is readily provided having preferred number average molecular weight (Mn) of about 1000–12,000. For use in solvent-based sprayable coating compositions, such resin is readily provided having preferred number average molecular weight (Mn) of about 1000–3000. Such molecular weight control is achieved by selection of diepoxide reactant having appropriate epoxide equivalent weight and by adjusting the molar ratio of diepoxide to amine functional diene to mono-hydroxy functional diene (or other monofunctional end-capping reactant). Lower molecular weight resin is provided as this ratio approaches 2:1:1, respectively; higher molecular weight resin is provided as it approaches 1:1:0. Control of the molecular weight of the blocked dieneophile functional aminoepoxy resin is provided in the same manner. Of course, in preparing the diene functional aminoepoxy resin, it should be understood that sufficient excess diepoxide reactant is employed to provide epoxy functionality for reaction with the aforesaid modifying agent and second modifying agent.

The aforesaid crosslinkable compositions comprising diene functional resins of the invention can be adapted for use in solvent-based sprayable primer coating compositions. Such primer compositions can be used, for example, to form heat curable, highly alkali resistant primer coatings on motor vehicle body panels. Such compositions comprise substantially gel-free diene functional aminoepoxy resin, as described above, and substantially gel-free blocked dieneophile functional aminoepoxy resin, as described above, each preferably of number average molecular weight (Mn) about 1000–3000. The compositions can be thinned to desired viscosity with suitable solvent such as, for example, methyl amyl ketone.

Compositions comprising diene functional resins of the invention are particularly suitable for use in cathodic electro-deposition. For such use, the composition comprises (i) substantially gel-free diene functional aminoepoxy resin, as described above, preferably of number average molecular weight (Mn) about 1000–12,000, at least partially neutralized with a solubilizing acid, typically an organic acid such as, for example, acetic acid or the like, and (ii) substantially gel-free blocked dieneophile functional aminoepoxy resin, as described above, preferably of number average molecular weight (Mn) of about 1000–9000, also at least partially neutralized. The at least partially neutralized resins are dispersed together in aqueous solvent. Such coating composition will deposit a heat curable coating at the cathode in an electrodeposition coating process according to techniques well known to the skilled in the art.

Other features and advantages of the present invention will become more apparent from the following detailed description including the preferred embodiments and best mode of the invention.

DETAILED DESCRIPTION OF THE INVENTION

Diene Functional Modified Aminoepoxy Resin Diepoxide Reactant

The conjugated diene functional modified aminoepoxy resin comprises the reaction product of any of a wide variety of diepoxide reactants, for example aliphatic and aromatic diepoxides, with amine functional diene. Suitable diepoxide reactant has number average molecular weight of about 300–8,000, preferably about 300–4,000. In general the epoxide equivalent weight is selected to suit the intended use of the final composition. Thus, for sprayable solvent-based coating compositions a lower composition viscosity is desirable. For such use it is generally preferable to employ diepoxide having epoxide equivalent weight of about 150–1000. In comparison, for example, cathodic electrodeposition compositions of the invention preferably have higher viscosity and for such use diepoxides having epoxide equivalent weight of about 150–2000 are generally preferred.

The diepoxide is preferably free of carboxy ester moieties linking the epoxide groups, since such carboxy ester-free diepoxides have been found to provide cured coatings according to the invention which are significantly more alkali resistant and provide significantly enhanced corrosion protection to the underlying substrate.

One class of suitable diepoxides includes the Bisphenol A-epichlorohydrin resins. These are commercially available as, for example, Epon 828, 1001 or 1004 (trademarks) marketed by Shell Chemical Company, Houston, Tex., U.S.A. Suitable diepoxides may contain aromatic groups, such as benzene nuclei, at a preferred average of at least about one, more preferably at least about two, for each terminal epoxy group. Especially suitable are Bisphenol A-epichlorohydrin resins comprising up to 10 or more bis-phenol moieties within the epichlorohydrin reaction product backbone, for example those of number average molecular weight up to about 8000, preferably 300–4000.

Aliphatic diepoxides, particularly lower molecular weight aliphatic diepoxides, including cycloaliphatic diepoxides are used preferably in conjunction with aromatic diepoxides to modify coating properties. Certain lower molecular weight aliphatic diepoxides used alone may produce coatings which are relatively more humidity sensitive. Suitable aliphatic diepoxides include, for example, the reaction product of epihalohydrin with aliphatic diols such as glycol, epoxidized polybutadienes, vinylcyclohexenedioxide and dipentene dioxide. Still further, hydrogenated Bisphenol A-epichlorohydrin products may also be employed.

Numerous additional suitable diepoxides are commercially available or readily prepared using well known techniques and commercially available starting materials, and these will be apparent to the skilled of the art in view of the present disclosure. Compatible mixtures of any of these compounds also are suitable.

Amine Functional Diene Chain Extending Reactant

Amine functional dienes suitable for use in preparing the resin of the present invention are those comprising conjugated double bonds, particularly, those suitable for Diels Alder cycloaddition reaction at elevated temperature with ene-functionality or with other dieneophile functionality. Suitable amine functional dienes include many well known to the skilled of the art. Preferred are monoprimary amine functional dienes, preferably of molecular weight about 70–300 and preferably comprising no functionality substantially reactive with the diepoxide, other than the N-hydrogens. Exemplary monoprimary amine functional dienes include furfuryl amine, 2-aminomethyl-1,3-butadiene, and the like and mixtures thereof. Suitable di-secondary amine functional bis-dienes will be apparent to the skilled of the art in view of the present disclosure and can be prepared using well known techniques and commercially available reactants.

According to one most preferred embodiment, the monoprimary amine functional diene reactant is of the general formula:

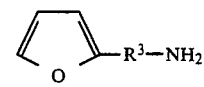

wherein $R^3$ is a divalent organic linking moiety containing no ester groups and preferably no functionality substantially reactive with the other reactants under reaction conditions experienced in the preparation of the aminoepoxy resin.

Preferably, as noted above, the chain-extended reaction product of diepoxide with amine functional diene is end-capped. The end-capping agent preferably is monohydroxy functional conjugated diene. Suitable monohydroxy functional dienes include many well known to the skilled of the art and preferably is of molecular weight about 70–300 and preferably comprises no functionality substantially reactive with the diepoxide other than the hydroxy group. Exemplary monohydroxy dienes include furfuryl alcohol and 2-hydroxymethyl-1,3-butadiene and the like and any compatible mixture thereof. The end-capping agent also can be a monoamine reactant, preferably monoamine functional conjugated diene reactant. Typically, a mono-secondary amine is used to provide true end-capping of the aminoepoxy resin. It will be understood by the skilled of the art, however, that mono-primary amine also can be used as an "end-capping agent" according to the present invention, although a certain degree of chain extension may result. Mono-primary amine end-capping agent can be used as one means of increasing to some extent the molecular weight of the product resin. Suitable monohydroxy functional dienes and monoamine functional dienes include those of the general formula:

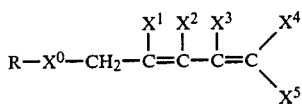

wherein:

R is a monohydroxy functional hydrocarbon moiety or a monoamine functional hydrocarbon moiety, respectively, which preferably comprises no functionality substantially reactive with the diepoxide reactant other than the hydroxy or amine functionality, respectively;

$X^0$ is

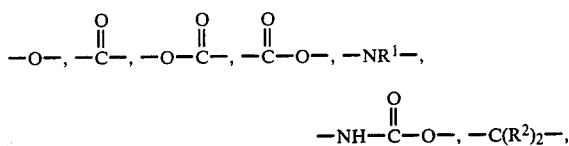

or the like, wherein $R^1$ is hydrogen, straight, branched or cyclo alkyl, aryl, arylalkyl or the like, and each $R^2$ is the same or different and is selected from hydrogen, straight, branched or cyclo alkyl, aryl, arylalkyl, or the like; and $X^1$, $X^2$, $X^3$, $X^4$ and $X^5$ are the same or different and each is hydrogen, straight, branched or cyclo alkyl, aryl, arylakyl, or the like, or $X^1$ and $X^5$ together are alkylene, —O—, or —$NR^1$— wherein $R^1$ is as defined above, or like divalent group (resulting in a cyclic diene moiety).

The diepoxide reactant is reacted with the end-capping agent, if any, and the amine functional diene according to methods well known to the skilled in the art. Accordingly, for example, a stoichiometric amount of an equimolar mixture of monohydroxy functional diene end-capping reactant and amine functional diene chain extending reactant are mixed with the diepoxide reactant and heated to reaction temperature, typically above 120°-150° C., until substantially all epoxide functionality has reacted. As noted above, however, the molar ratio of reactants can be varied to provide diene functional aminoepoxy resin of desired molecular weight. Also, as further discussed below, the resin is modified by reaction with a modifying agent and a second modifying agent and, accordingly, sufficient diepoxide reactant is employed for reaction therewith.

The reaction product, that is, the aminoepoxy resin, comprises, on average, at least one diene moiety per molecule. Each diene moiety will be available for reaction with a dieneophile moiety of a blocked dieneophile functional aminoepoxy resin during heat curing of a composition according to the invention. More preferably, the diene functional aminoepoxy resin provides, on average, about two or more, most preferably about 3-10 diene moieties per molecule to provide good crosslinking.

Blocked Dieneophile Functional Aminoepoxy Reactant

Blocked dieneophile functional aminoepoxy resins suitable for use in a thermosetting composition together with the conjugated diene functional modified aminoepoxy resins of the invention preferably comprise, on average, two or more, preferably at least about 3, most preferably about 3-10, blocked dieneophile groups per molecule. The blocked dieneophile groups are capable of reacting with the diene moieties of the diene functional aminoepoxy resin upon curing the composition at elevated temperature, typically about 100°-200° C. Preferably the dieneophile moiety is an ene moiety although other suitable dieneophile moieties will be apparent to the skilled of the art in view of the present disclosure. The diene functional modified aminoepoxy resin of the invention and suitable dieneophile functional aminoepoxy resin are found to afford well cured coatings when employed in compositions together in ratio of between about 1:0.1 to about 0.1:1 equivalents, respectively, with lower molecular weight resins of the invention preferably used in ratio of about 2:1 to about 1:2.

Suitable dieneophile functional aminoepoxy resin preferably is provided as the reaction product of suitable mono-primary amine functional blocked dieneophile with suitable diepoxide reactant including any of those diepoxides described above for preparation of the diene functional aminoepoxy resin. Accordingly, such dieneophile functional resins also provide nitrogen sites for at least partial neutralization upon addition of neutralizing acid, many of which acids are well known to the art, as described above. Such at least partially neutralized dieneophile functional resins are readily dispersed into aqueous solvent for preparation of cathodic electrodeposition compositions.

The mono-primary amine functional blocked dieneophile reactant is preferably the reaction product of maleic anhydride, unsaturated lactone, or a compatible mixture thereof with a suitably reactive diene and a suitably reactive diamine. The diene reactant acts as a reversible blocking agent for the dieneophile functionality and such reaction can be carried out prior to, during or after the reaction with the diamine. The diene reactant preferably has a boiling point at or below the cure temperature of the coating composition such that it will be driven from the coating composition during cure thereof, and not compete with the diene functionality of the diene functional aminoepoxy resin for reaction with the blocked dieneophile functional aminoepoxy resin. To maximize yield of mono-primary amine functional blocked dieneophile, it is preferred to add the anhydride or lactone reactant slowly to an excess of diamine reactant.

According to one prefered embodiment, the mono-primary amine functional blocked dieneophile reactant comprises amino maleamic acid, specifically, the reaction product of suitable diamine with 3,6-endoxo-1,2,3,6-tetrahydrophthalic anhydride. The named anhydride is commercially available, for example from Aldrich Chemical Co., Milwaukee, Wis., U.S.A. and also can be prepared as the reaction product of furan with maleic anhydride.

More generally, suitable amine functional blocked dieneophile reactant comprises the reaction product of (i) suitable diamine, and (ii) suitable conjugated diene reversible blocking agent, with (iii) ene reactant selected from the group consisting of maleic anhydride, suitable unsaturated lactones or the like or any compatible mixture thereof, wherein the lactone preferably is selected from those of the general formula:

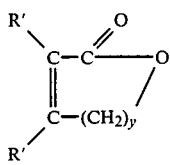

wherein each $R'$ is selected independently from H, $C_1$–$C_5$ alkyl, $C_1$–$C_5$ hydroxy alkyl and the like, and y is preferably about 1–4. Numerous suitable diamines are commercially available and will be apparent to the skilled of the art in view of the present disclosure. Suitable diamines include those of the general formula $H_2N$—$R^5$—$NH_2$ wherein $R^5$ is any divalent organic linking moiety of at least two carbons, preferably 2–15 carbons, which is substantially unreactive (under conditions experienced by the amine functional blocked dieneophile reactant in the preparation of the aminoepoxy resin) with the other reactants. Included are branched, straight and cyclic aliphatic diamines, aromatic diamines and arylaliphatic diamines. Exemplary diamines include isophorone diamine which is preferred in view of the difference in reactivity of the two amine groups resulting in higher yield of the desired product, 1,4-butanediamine, 1,5-pentanediamine, 1,6-hexanediamine, and a compatible mixture of any of them. Other preferred diamines include those of molecular weight about 80–300 which comprise no substantially reactive functionality other than amine. Exemplary such diamines include 1,2-ethylenediamine, 1,3-propanediamine, the isomers of toluene diamine and the like and a compatible mixture of any of them.

Suitable conjugated diene blocking agents include numerous commercially available dienes readily apparent to the skilled of the art in view of the present disclosure. Included are any sufficiently reactive conjugated aliphatic, cyclic aliphatic, and heterocyclic dienes which will liberate or de-block from the dieneophile moiety at the cure temperature of the coating composition. The diene blocking agent should be substantially unreactive with the other reactants except for the dieneophile functionality of the ene reactant. Exemplary conjugated diene blocking agents include furan which is preferred since it de-blocks at approximately 120° C., conjugated cycloalkadiene such as 1,3-cyclopentadiene and 1,3-cyclohexadiene, conjugated alkadiene preferably of about 4–10 carbons, for example, 1,3-butadiene, 2-methyl-1,3-butadiene, and the like and a compatible mixture of any of them. The reactions described above for preparation of the blocked dieneophile functional aminoepoxy resin can be conducted according to methods well known to the skilled of the art. It should be noted that where symmetrical diamine is employed, such as 1,6-hexanediamine, rather than diamine wherein one amino group is substantially more reactive than the other, such as isophorone diamine, there can be a portion of the diamine reactant in which both amine groups remain unreacted due to reaction of both amine groups of another portion of the diamine reactant. To prevent subsequent unwanted amine reactions and gelling, substantially all unreacted diamine should be removed from the reaction product. Removal of diamine can be done by methods known to the skilled of the art, for example by thorough rinsing of the reaction product with dimethoxy ethane or other suitable solvent.

In the reaction of the amine functional blocked dieneophile reactant with the diepoxide reactant, an additional reactant can be employed, an end-capping reactant, which preferably is substantially unreactive with the amine functional blocked dieneophile reactant and which provides a single functionality such as amino, more preferably hydroxy, which is reactive with the epoxy functionality of the diepoxide reactant (or of the chain extended aminoepoxy intermediate reaction product). Such additional reactant is preferably a monofunctional blocked dieneophile. (Monofunctional in this usage meaning only a single functionality substantially reactive with epoxy functionality and not being exclusive of blocked dieneophile functionality.) Most preferred is the reaction product of a suitable diene blocking agent, as described above, such as furan, cyclopentadiene, or the like, with monohydroxy functional dieneophile such as, for example, hydroxypropyl methacrylate, methylol maleimide or the like or a compatible mixture thereof. Since such monofunctional end-capping reactant provides only end-capping and not chain-extending reaction (except to the extent provided by a mono-primary amine end-capping reactant as discussed above in connection with the diene functional aminoepoxy resin) with the diepoxide reactant, blocked dieneophile functional aminoepoxy resin of lower molecular wight can be provided according to this embodiment. Such lower molecular weight resin is particularly advantageous for use in sprayable solvent-based coating compositions. Diepoxide reactant, amine functional blocked dieneophile reactant and monofunctional end-capping reactant are employed preferably in ratio of about 2:1:1 to about 1:1:0 equivalents, respectively, with the latter ratio providing higher molecular weight reaction product. As noted above, however, the blocked dieneophile functional aminoepoxy resin may be modified by reaction with a modifying agent and/or a secondary modifying agent, in which case sufficient diepoxide reactant is employed for reaction therewith.

Modifying Agent

According to one characterizing aspect of the invention, the diene functional aminoepoxy resin (and, optionally, the dieneophile resin which may be used therewith) is prepared using diepoxide reactant in excess of that to be reacted with the amine functional diene chain extending reactant (or amine functional blocked dieneophile chain extending reactant, as the case may be) and with the end-capping reactant, if any. Sufficient diepoxide reactant is employed to make available epoxy groups for reaction with the above-mentioned modifying agent. Preferably about 10–20% of the total epoxy functionality is reacted with the modifying agent. That is, the molar equivalent ratio of modifying agent secondary amine functionality to diepoxide reactant (or aminoepoxy intermediate reaction product) epoxy functionality is from about 0.1:1 to about 0.2:1, respectively.

The modifying agent comprises hydroxy functional secondary amine having a total of up to about 20 carbons per amino nitrogen. More preferably, at least about 75 mole percent of the modifying agent comprises at least one and preferably two primary hydroxyl groups, each hydroxyl group on a carbon atom being at least one carbon removed from any amino nitrogen. Preferred secondary amine reactants include, for example, alkylalkanolamine, dialkanolamine, N-alkanolaniline and the like and a compatible mixture of any of them, wherein each alkyl moiety and each alkanol moiety has from one to about ten carbons, more preferably one to about six carbons. Most preferred are the $C_1$–$C_5$ dialkanolamines, especially diethanolamine, in view of their ready commercial availability, low cost, and ease of reaction with the preferred polyepoxides. While not wishing to be bound by theory, it is presently understood that each hydroxy group contributed by the modifying agent to the resin product is available for polar-polar interaction with aqueous solvent, thereby enhancing the dispersibility of the resin in aqueous solvent and rendering the aqueous dispersion more stable. It is believed to be consistent with such explanation that dialkanolamine bearing two primary hydroxy groups is found to provide exceptionally good results.

A preferred class of hydroxy functional secondary amine modifying agents includes those of general formula:

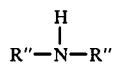

wherein each R" is selected independently from straight or branched chain monovalent aliphatic moieties of up to about 10 carbons each, at least one and preferably both R" being substituted by hydroxy on a primary carbon atom that is not adjacent to any amino nitrogen. R" also can form with the nitrogen part of a heterocyclic ring compound, such as a six member ring. More preferably, both R" are independently alkanol of up to 7 carbons each, even more desirably up to 4 carbons each.

The diepoxide reactant or the previously chain extended intermediate reaction product of the diepoxide reactant with amine functional diene reactant (or with amine functional blocked dieneophile reactant) and the hydroxy functional secondary amine modifying agent are reacted under conditions that allow opening of the epoxy ring by amino nitrogen to provide a gel-free reaction product. Suitable reaction conditions and techniques are well known to the skilled of the art and will be apparent from the present disclosure. Thus, for example, the reaction medium preferably comprises non-aqueous medium that may be of diverse but preferably polar character and serves to maintain contact of reactants, to control reaction speed, to maintain desirable viscosity and to perform other functions well known in the art. Thus, suitable solvents and diluents for the reaction medium include aromatic and aliphatic hydrocarbons, ethers, ketones such a methylamyl ketone, n-amyl ether, xylene, oxygenated solvents such as cellosolves, for example, butyl Cellosolve acetate, hexyl Cellosolve acetate, and the like including mixtures of these. Elevated reaction temperatures may be employed to faciliate reaction between the epoxy functional resin and the modifying agent. Preferably, the reaction conditions are chosen such that there is only one reaction between the intermediate reaction product and the modifying agent, specifically, that between an epoxy group and the N-hydrogen of the modifying agent.

Second Modifying Agent

According to another characterizing aspect of the invention, the diene functional aminoepoxy resin (and, optionally, the dieneophile resin which may be used therewith) is prepared using sufficient diepoxide reactant for reaction with a second modifying agent. That is, diepoxide reactant is used in excess of that to be reacted with the amine functional diene chain extending reactant (or amine functional blocked dieneophile chain extending reactant, as the case may be), modifying agent, and end-capping reactant, if any. For use in electrodeposition of coatings, it is preferred that both resins be modified by reaction with the first modifying agent, hydroxy functional secondary amine, for the improved bath stability provided thereby. In view of the somewhat harsher reaction conditions and reaction time needed for reaction with the second modifying agent, as now discussed, it is preferred for most applications that only the diene functional aminoepoxy resin be modified by reaction with the second modifying agent. This avoids potential deblocking of the blocked dieneophile functional aminoepoxy resin during reaction thereof with the second modifying agent. Of course, it will be recognized that the second modifying agent can be reacted with the diepoxide reactant prior to the amine functional blocked dieneophile reactant. Since the second modifying agent is in the nature of an end-capping agent, however, it preferably is reacted last. Also, reacting it last avoids potential epoxy-epoxy reactions and gellation due, again, to the somewhat harsher reaction conditions employed.

The second modifying agent is selected from the group consisting of secondary amine terminated butadiene acrylonitrile copolymer resins, carboxy terminated butadiene acrylonitrile copolymer resins, and mixtures thereof, which resins have number average molecular weight of about 1400–4400, preferably about 3400–3600, and amine or carboxy equivalent weight of about 700–2200, preferably about 800–1200. It should be recognized that in addition to the two terminal amine groups, or carboxy groups, the copolymers may bear additional such groups pendant from the copolymer chain. Numerous suitable second modifying agents are commercially available or are readily prepared using available materials and well known techniques, as will be apparent to the skilled of the art in view of the present disclosure. Suitable carboxy terminated second modifying agent can be prepared, for example, according to methods well known to the skilled of the art by copolymerization of acrylonitrile monomer with butadiene monomer. Thus, for example, free radial polymerization can be carried out accoridng to well known techniques using, for example, monomeric azodicyano valeric acid initiator. Preferably the acylonitrile monomer contributes about 10–27% by weight of the butadiene acrylonitrile copolymer. The corresponding secondary amine terminated second modifying agent can be readily prepared by reacting the aforesaid carboxy terminated polymerization product with suitable amine such as, for example, n-aminoethyl piperazine or the like. The secondary amine terminated butadiene acrylonitrile copolymers are preferred, especially when the aminoepoxy resin is to be used in an electrocoating composition since the amino nitrogens are believed to aid in solubilizing the resin upon acid neutralization thereof.

Suitable second modifying agents include, for example, the group consisting of butadiene acrylonitrile copolymer according to formula I:

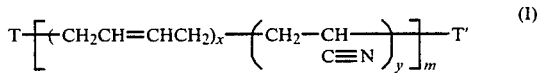

wherein x on average is about 3–7, y on average is about 1, m on average is about 6–11 and T and T' are selected independently from carboxy and secondary amine bearing moiety. According to one preferred embodiment, the additive resin is a copolymer according to formula I wherein T and T' each is

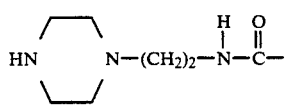

and where x on average is about 5, y on average is about 1, and m on average is about 7.

Suitable second modifying agents also are commercially available. Commercially available secondary amine terminated butadiene acrylonitrile resins include, for example, the "Hycar" ATBN (trademark) series available from B. F. Goodrich Chemical Company, Cleveland, Ohio, of which ATBN - 1300×16 is generally preferred. It has a Brookfield viscosity at 27° C. of 2350 poise, a total amine equivalent weight of 900 and acrylonitrile content of 16%. Commerically available carboxy terminated butadiene acrylonitrile copolymer resins suitable for use as second modifying agent include, for example, the "Hycar" CTBN (trademark) series and "Hycar" CTBNX (trademark) series available from B. F. Goodrich Chemical Company, Cleveland, Ohio. The "Hycar" CTBN resin is a butadiene acrylonitrile copolymer having terminal carboxyl groups which may be represented structurally as follows:

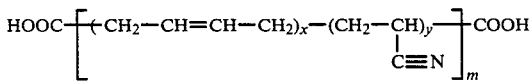

wherein on the average x=5, y=1 and m=10. It has a Brookfield viscosity at 27° C. of 1,310 poise, an average number molecular weight of 3,080, an equivalent weight per carboxyl group of 1,885, an equivalent weight of carboxyl group per hundred parts of polymer of from 0.04 to 0.08 and a carboxyl group functionality of 1.735. The "Hycar" CTBNX resin is a butadiene acrylonitrile copolymer having terminal and pendant carboxyl groups. It has a Brookfield viscosity at 27° C. of 1,500, an average number molecular weight of about 3,365, an equivalent weight per carboxyl group of about 1,540, an equivalent weight of carboxyl group per hundred parts of polymer of from 0.05 to 0.09 and a carboxyl group functionality of 2.34. Other carboxy and secondary amine terminated butadiene acrylonitrile copolymers sitable for use as second modifying agents will be apparent to the skilled of the art in view of the present disclosure. Other suitable carboxy and secondary amine terminated butadiene acrylonitrile copolymers for use as the second modifying agent will be apparent to the skilled of the art in view of the present disclosure.

The use of second modifying agent according to the present invention is found to provide highly significant advantages, particularly in those embodiments wherein the aminoepoxy resins of the invention are employed in an electrocoating composition. Specifically, such compositions incorporating aminoepoxy resins modified by the above described carboxy or, more preferably, secondary amine terminated butadiene acrylonitrile copolymer resin are found to be far better stabilized. Thus, for example, such compositions have better shelf life and better resist spontaneous, in-the-bath gelling. Moreover, such compositions have been found to produce thicker films, to tolerate higher operating voltages and to have significantly improved throwing power. Following curing at elevated temperature, the cured coating has been found to have improved surface appearance. In addition, resistance to corrosion, especially resistance to condensing humidity, is significantly improved, most notably for coatings cured at lower temperatures. Accordingly, the present invention is seen to provide a significant economic advantage and to be an important advance in the art.

The amine functional diene chain extending reactant, end-capping reactant (if any), modifying agent, and second modifying agent, are reacted with the diepoxide reactant in any suitable order or simultaneously in preparing the aminoepoxy resins of the invention. The same is true regarding preparation of the above-mentioned dieneophile functional aminoepoxy resins with which the diene functional resin of the invention may be used. It will be within the skill of the art to select suitable molar ratios, in view of the relative reactivity of the reactants, to achieve the desired degree of diene or blocked dieneophile functionality in the product aminoepoxy resin. Likewise, for the end-capping reactant, modifying agent and second modifying agent, it will be within the skill of the art to select suitable reactant molar ratios, in view of their relative reactivities, to produce an aminoepoxy resin product having the desired number average molecular weight and having the desired degree of functionality.

The diene functional aminoepoxy resins and the blocked dieneophile functional aminoepoxy resins can be prepared by (a) first reacting an excess of suitable diepoxide reactant with the amine functional (diene or blocked dieneophile) chain extending reactant, the hydroxy functional secondary amine modifying agent, and end-capping reactant, (if any), and (b) subsequently reacting with the butadiene acrylonitrile copolymer resin second modifying agent. As noted above, care must be exercised in exposing the blocked dieneophile functionality to the reaction conditions used for reacting the second modifying agent. Suitable reaction conditions for reaction of diepoxide (or a previously chain-extended, end-capped and/or modified intermediate reaction product) with the second modifying agent typically would be about 60°–80° C. for 3-4 hours. If the butadiene acrylonitrile copolymer resin second modifying agent is reacted after the blocked dieneophile chain extending reactant, then preferably it is reacted at temperatures not exceeding about 90° C., more preferably not exceeding about 80° C.

As noted above, the modifying agent preferably is used in amount (i.e., reactant molar ratio) sufficient to react with approximately 10–20% of the total epoxy functionality of the diepoxide reactant. The second modifying agent is used in amount sufficient to constitute from about one weight percent to about 30 weight percent of the aminoepoxy resin reaction product. Preferably the second modifying agent is used in amounts of about 5–20 percent of total resin weight, most preferably about 10 percent. As noted above, it will be within the skill of the art to select molar ratios for the modifying agent and second modifying agent, in view of the relative reactivity of each, to achieve the desired degree of reaction. It also will be within the skill of the art using known methods to remove unreacted components from the aminoepoxy reaction product. Preferably the aminoepoxy resin product contains less than about 20% of the original epoxy group unreacted, and typically will have less than about 10% unreacted epoxy groups.

Crosslinking Agent

The diene functional aminoepoxy resin of the invention provides hydroxy functionality as a result of the amine/epoxy reactions. Also, the blocked dieneophile functional aminoepoxy resin described above as being suitable for use therewith provides free hydroxy groups. In addition, the hydroxy functional secondary amine modifying agent contributes hydroxy functionality. Therefore, according to one embodiment of the invention the crosslinkable composition further comprises suitable crosslinking agent reactive with such hydroxy groups. Numerous such crosslinking agents are well known to the skilled of the art and include, for example, any of a variety of aminoplast crosslinking agents, for example, partially alkylated melamines (melamines formaldehyde resins modified by alcohols), for example, partially methylated melamines and butylated melamines, polyalkyl ethers of the polymethylol melamines, for example, hexamethoxy methylmelamine; urea formaldehyde condensate modified by alcohol, for example, paraformaldehyde and trioxane; polymethylol compounds of hexamethylene diurea; polycarboxylic acid such as adipic acid and the dimethylol amide and methylol ether thereof; tetramethylolhydrazodicarbonamide; polymethylol compounds of polycaprolactam and methylol ethers thereof; and the like and a compatible mixture of any of them. Butylated melamines are preferred since they are readily commercially available and provide suitable crosslinking reactivity with the aminoepoxy resins of the invention.

Also suitable are blocked polyisocyanate crosslinking agents. As used herein "blocked polyisocyanate" means an isocyanate compound containing two or more isocyanato groups, each of which has been reacted with a blocking agent which will prevent reaction of the isocyanate group at room temperature with compounds that conventionally react with such groups, and at least some of which will permit that reaction to occur at higher (cure) temperatures. In general, the blocked polyisocyanate may be prepared by reacting a sufficient quantity of an active hydrogen containing blocking agent with the polyisocyanate to insure that substantially no free isocyanato groups are present.

The proper proportion of blocked polyisocyanate crosslinking agent to diene functional aminoepoxy resin and blocked dieneophile functional aminoepoxy resin will depend, in part, upon the degree of hydroxy functionality of such resins, the properties desired in the coating to be produced and, in part, upon the desired cure response of the coating composition (which will depend, in turn, upon the baking schedule to be used in curing the coating composition) and, in part, upon the desired storage stability of the composition, that is, upon the desired shelf life. Accordingly, the amounts of such crosslinker that can be used varies considerably. However, it will be within the skill of the art in view of the present disclosure to provide blocked polyisocyanate crosslinking agent in suitable amounts. Blocked polyisocyanates of numerous types may be employed in the compositions of the invention. Particularly suitable blocked polyisocyanates, which will be discussed further hereinafter, include blocked polymethylene polyphenol isocyanates, isocyanurate ring containing blocked polyisocyanates and certain oligoester modified blocked polyisocyanates.

In the preparation of the blocked polyisocyanate crosslinking agent, any suitable organic polyisocyanate may be used. Representative examples include the aliphatic compounds such as trimethylene, tetramethylene, pentamethylene, hexamethylene, 1,2-propylene, 1,2-butylene, 2,3-butylene, 1,3-butylene, ethylidene and butylidene diisocyanates; the cycloalkylene compounds such as 1,3-cyclopentane, 1,4-cyclohexane, and 1,2-cyclohexane diisocyanates; the aromatic compounds such as m-phenylene, p-phenylene, 4,4'-diphenyl, 1,5-naphthalene, and 1,4-naphthalene diisocyanates, the aliphatic-aromatic compounds such as 4,4'-diphenylene methane, 2,4- or 2,6-tolylene, or mixtures thereof, 4,4'-toluidine, and 1,4-xylylene diisocyanates; substituted aromatic compounds such as dianisidine diisocyanate, 4,4'-diphenylether diisocyanate and chlorodiphenylene diisocyanate; the triisocyanates such as triphenyl methane-4,4'4''-triisocyanate, 1,3,5-triisocyanate benzene and 2,4,6-triisocyanate toluene; the tetraisocyanates such as 4,4'-diphenyldimethyl methane-2,2',5,5' tetraisocyanate; and the polymerized polyisocyanates such as tolylene diisocyanate dimers and trimers, and the like.

In addition, the organic polyisocyanate may be a prepolymer derived from a polyol including polyether polyol or polyester polyol, including polyethers which are reacted with excess polyisocyanates to form isocyanate-terminated prepolymers. The polyols may be simple polyols such as glycols, e.g., ethylene glycol and propylene glycol, as well as other polyols such as glycerol; tri-methylolpropane, pentaerythritol, and the like, as well as mono-ethers such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxyl-terminated polyethers and can be linear or branched. Examples of polyethers include polyoxyethylene glycol, polyoxypropylene glycol, polyoxytetramethylene glycol, polyoxyhexamethylene glycol, polyoxynonamethylene glycol, polyoxydecamethylene glycol, polyoxydodecamethylene glycol and mixtures thereof. Other types of polyoxyalkylene glycol ethers can be used. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

A particular class of aromatic polyisocyanates which may be employed in the novel solvent based coating compositions of the invention are polymethylene polyphenol isocyanates having the formula:

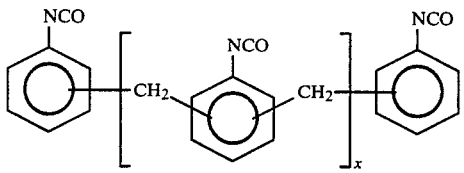

wherein x equals 1 to 3. The compounds, sold under the tradename "PAPI" by the Upjohn Chemical Company of Kalamazoo, Mich., are particularly useful in compositions of the invention, resulting in compositions exhibiting desirable toughness in the final cured coating.

The active hydrogen containing blocking agents which are reacted with the above described organic diisocyanates may be selected from numerous blocking agents which will be apparent to those skilled in this art. Preferred blocking agents include, for example, those selected from the group consisting of (i) aliphatic, cycloaliphatic and aromatic alkyl monoalcohols; (ii) hydroxyl amines; (iii) oximes; (iv) lactams; and (v) triazoles. Any suitable aliphatic, cycloaliphatic or aromatic alkyl monoalcohol may be used as a blocking agent in accordance with the present invention. For example, aliphatic alcohols, such as methyl, ethyl, chloroethyl, propyl, butyl, amyl, hexyl, heptyl, octyl, nonyl, 3,3,5-trimethylhexyl, decyl, and lauryl alcohols, and the like may be employed. Suitable cycloaliphatic alcohols include, for example, cyclopentanol, cyclohexanol and the like, while aromatic-alkyl alcohols include phenylcarbinol, methylphenylcarbinol, and the like. Minor amounts of even higher molecular weight relatively non-volatile monoalcohols may be used, if desired, to serve as plasticizers in the coatings provided by the invention. Examples of hydroxyl amines which may be employed as blocking agents include ethanol amine and propanol amine. Suitable oxime blocking agents include, for example, methylethylketone oxime, acetone oxime and cyclohexanone oxime. Examples of lactams which may be used as blocking agents are e-caprolactam, q-butyrolactam and pyrrolidone, while suitable triazoles include compounds such as 1,2,4-triazole, 1,2,3-benzotriazole, 1,2,3-tolyl triazole and 4,5-diphenyl-1,2,3-triazole. Particularly preferred active hydrogen containing blocking agents are methylethyl ketoxime and 2-ethylhexanol.

(i) Isocyanurate Ring Containing Blocked Isocyanate Compounds

Within the scope of the above general class of blocked polyisocyanate crosslinking agents, a particular class or type of blocked polyisocyanate crosslinking agent which may be employed in the coating compositions of the invention comprises isocyanurate ring containing blocked isocyanate compounds. In general, these blocked polyisocyanates may be formed by blocking with the aforementioned blocking agents. These compounds may be formed by cyclotrimerization of difunctional isocyanates. Usually, the reaction does not stop in this stage and continues through the formation of polyfunctional oligomers or a mixture of such oligomers with a portion of the pure trifunctional polyisocyanate. Mixtures of trifunctional product and various polyfunctional oligomers are commercially available.

A particularly desirable blocked polyisocyanate crosslinking agent is the blocked form of the pure trifunctional isocyanurate represented by the following formula:

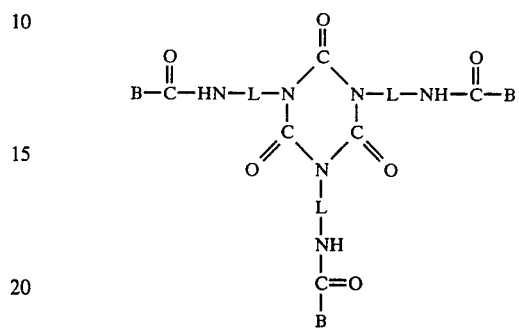

wherein each L is selected independently from the group consisting of aliphatic, cycloaliphatic and aromatic groups and combinations thereof and B is the residue of an active hydrogen containing blocking agent. More specifically, this compound is disclosed in U.S. patent application Ser. No. 368,178 filed April 14, 1982, the disclosure of which is hereby incorporated by reference.

(ii) Oligoester Modified Blocked Polyisocyanates

Still further particular blocked polyisocyanates useful as crosslinking agents in the coating compositions of this invention are oligoester modified blocked polyisocyanates prepared from a particular class of oligoester diols and triols. A first type of such oligoester modified blocked polyisocyanate is prepared from organic diisocyanates wherein one isocyanato group is more reactive than the other, with the more reactive isocyanato first being blocked with a blocking agent and the remaining isocyanato group then being reacted with hydroxyl functionality of an oligoester diol or triol as referred to above. The second type of oligoester modified blocked polyisocyanate may be prepared by reacting oligoester diols from the aforementioned class of oligoesters with an excess of organic diisocyanate so as to form an isocyanato terminated prepolymer followed by blocking of the terminal isocyanato groups of the prepolymer with an active hydrogen containing blocking agent. Each of these materials is particularly useful in the compositions of the invention and produces final cured coating compositions exhibiting good flexibility.

Oligoesters of the type employed in the preparation of these crosslinking agents are described in U.S. Pat. No. 4,322,508 issued March 30, 1982, the disclosure of which is hereby incorporated by reference. The hydroxy functional oligoesters within the useful class of materials (i) have a number average molecular weight (Mn) between about 150 and about 3000, preferably between about 230 and about 1000, (ii) bear 2 or 3 hydroxyl groups per molecule, and (iii) are formed by an esterification reaction between a carboxylic acid and an epoxide. The esterification reaction products are selected from the group consisting of:

(a) the esterification reaction product of polycarboxylic acid, i.e., carboxylic acid bearing 2 or more carboxyl groups, and monoepoxide;

(b) the esterification reaction product of polyepoxide, i.e., a compound having 2 or more epoxide groups, and monocarboxylic acid, preferably containing no ethylenic unsaturation, and bearing no hydroxy functionality;

(c) the esterification reaction product of hydroxy functional carboxylic acid and monoor polyepoxide, preferably monoepoxide;

(d) the esterification reaction product of mono-carboxylic acid and hydroxy functional mono or polyepoxide, preferably monoepoxide; and (e) mixtures of (a)–(d).

As noted above, the first type of oligoester modified blocked polyisocyanate crosslinking agent is prepared by (i) reacting organic diisocyanate bearing one isocyanato group which is more reactive than the other with a sufficient amount of an active hydrogen containing blocking agent to react substantially with all of the more reactive isocyanate groups, thus providing a half-blocked diisocyanate and (ii) reacting this half-blocked intermediate with the above discussed oligoester. The organic diisocyanates employed in this synthesis, as well as the active hydrogen containing blocking agents, are discussed above in connection with the preparation of the isocyanurate ring containing blocked isocyanate crosslinking agents useful in compositions of the invention. The organic polyisocyanate-blocking agent adduct intermediate is formed by reacting a sufficient quantity of the blocking agent with the organic diisocyanate to insure that one of the two —NCO groups on the diisocyanate is reacted. The reaction between the organic diisocyanate and the blocking agent is exothermic and the diisocyanate and the blocking agent are preferably admixed at temperatures no higher than about 80° C., preferably below about 50° C., to minimize the exothermic effect.

The diisocyanate/blocking agent intermediate is next reacted with the oligoester diol or triol described above so as to react substantially all free or unblocked isocyanato groups of the intermediate with hydroxyl groups of the oligoester. This reaction is carried out desirably at a temperature of about 80°–120° C.

As also discussed above, the second type of oligoester modified blocked polyisocyanate crosslinking agent useful in the novel solvent based coating compositions of the invention is prepared by reacting an excess of organic diisocyanate with an oligoester diol from the above described class of oligoesters followed by reaction of the terminal isocyanato groups formed on the resulant prepolymer with an active hydrogen containing blocking agent as described above so as to react with substantially all the isocyanato groups. The diisocyanate starting material is used in excess in amounts sufficient to insure that the intermediate is isocyanate terminated. Therefore, it is preferable that the organic diisocyanates and the dihydroxy functional oligoester be reacted in a molar ratio of from greater than 1:1 up to 2:1. Numerous diisocyanates of the type described hereinbefore may be employed in the preparation of this intermediate. While it is not necessary that one isocyanato group be more reactive than the other, the preparation of this type of crosslinking agent does not preclude the use of such material.

Other suitable crosslinking agents will be apparent to the skilled of the art in view of the present disclosure.

In the crosslinkable compositions of the invention, if an aminoplast or blocked polyisocyanate crosslinking agent is employed, it may be advantageous in certain embodiments or for certain applications to include in the composition any of a variety of compatible catalysts known to the skilled of the art to catalyze reaction of same with hydroxy, for example, for aminoplast crosslinking agent, paratoluenesulfonic acid, phosphoric acid, phenol acid phosphate, butyl maleate and the like or a compatible mixture of any of them. Exemplary catalysts for blocked polyisocyanate crosslinking agent include the Lewis acid catalysts and others known to the skilled of the art. In addition, a flow control agent, for example, polybutylacrylate; a wetting agent, for example, silicone; pigments; a pigment dispersent; and/or a corrosion inhibitor, for example, chromate pigment, several of all of which are known to the skilled of the art, may be employed in the coating compositions of the invention.

Di- and polyhydroxy compounds of diverse character may be employed also in the composition of the invention to modify the properties of the composition (i.e. the properties prior to or following cure) as well as to act as solvent, including reactive solvent, for solubilizing the crosslinking composition. Thus, for example, these compounds may impart increased flexibility or reduce cratering in spray-applied cured films of the crosslinking composition of the invention. Exemplary hydroxy compounds include ethylene glycol, dipropylene glycol, 1,6-hexanediol, and polycaprolactone diols. Another class of glycols includes hydroxy terminated polybutadienes, hydrogenated bis-phenol-A, such hydroxy compounds being of generally hydrophobic character and molecular weights of about preferably 100–5000, number average. Higher boiling solvents (e.g., boiling point above about 180° C. as 190°–250°) that are of polar character may tend to interact with the resinous components of crosslinking composition and thereby allow higher solids content. If such hydroxy functional compounds are included in the composition of the invention, then crosslinking agent reactive with hydroxy functionality, such as described above, may be employed, preferably in stoichiometic amount.

As noted above, pigments may be used in the compositions comprising the aminoepoxy resins of the invention in accordance with known techniques. Pigments are employed most typically, for example, to enhance the efficacy of compositions employed as coating compositions over corrosion susceptible substrates. Chromate pigments, in particular, have been used to enhance corrosion protection. It is, however, a significant advantage of the present invention that chromate pigments need not be employed in compositions employed to form coatings over corrosion susceptible substrates. Cured coatings formed by compositions comprising the aminoepoxy resins of the invention along with dieneophile functional aminoepoxy resin as described above are highly alkali resistant and provide excellent corrosion protection even without chromate pigments. Such pigments and others can be employed, however, and may be desirable for aesthetic purposes. Exemplary pigments include titanium dioxide, silica, carbon black, and barytes and are employed typically at pigment: binder weight ratios of about 40:60 to about 60:40.

It is one characterizing aspect of the present invention that the substituent groups on the diene functionality and on the dieneophile functionality of the aminoepoxy resins can be selected to provide the desired degree of reactivity, that is, cure response. In particular, the degree of reactivity is increased by diene moiety substitution groups which, in net effort, are electron donating, that is, which decrease the electron affinity of the diene functionality conjugated double bond. Thus, reactivity is increased by substituent groups such as, for example, amine and ether linkages, sulfoxide, sulfone, urethane and the like. Similarly, it will be understood by the skilled of the art in view of the present disclosure, that the shelf stability of the composition is enhanced by ene moiety substitution groups which, in net effect, are electron withdrawing, that is, which increase the electron affinity of the ene functionality double bond. Thus, for example, shelf life is increased by electron withdrawing diene substitution groups such as nitro, cyano, ester

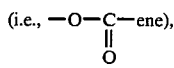

nitrile, carbonyl, straight, branched or cyclo alkyl or cyclo alkyl or alkylene, arylene, aralkylene, —O—, —NR—, —S and the like.

It will be within the ability of those skilled in the art, in view of the present disclosure, to select diene substituent groups which provide, in net effect, the desired compromise between shelf stability and reactivity. It generally is preferred that no electron withdrawing group(s) be substituted directly on any carbon of either diene functionality double bond, nor on any adjacent or next adjacent atom. In certain applications, however, a composition of the invention may require extended shelf life or for some other reason call for or tolerate diene functionality comprising electron withdrawing substitution groups on the diene moiety.

APPLICATIONS

As noted above, thermosetting compositions comprising diene functional aminoepoxy resins of the invention along with co-reactive dieneophile functional aminoepoxy resin are useful in a variety of applications including, especially, as coating compositions to provide an aesthetic and/or protective film on a substrate. In particular, such crosslinkable compositions of the invention can be formulated into a variety of primer formulations including both aqueous primer formulations and non-aqueous primer formulations. Such primers can be used as coatings for bare or treated steels (e.g., conversion coated with phosphates) as well as for guide coats over primers which were previously deposited, for example, by electrodeposition. Conventional modifying ingredients can be used in such primer formulations including, for example, flow control agents, pigments, pigment dispersents, thixotropes, anti-cratering aids, photo-stabilizers and the like, as indicated above.

Solvent Based Primers

Thermosetting compositions comprising diene functional modified aminoepoxy resin of the invention along with co-reactive dieneophile resin can be dispersed in organic solvent and applied to a substrate, for example a ferrous metal substrate, according to well known techniques such as by spray, curtain, dip and other coating application methods. Such solvent based coating compositions comprising diene functional functional aminoepoxy resins modified with hydroxy functional secondary amine modifying agent and with butadiene acrylonitrile copolymer resin second modifying agent, as disclosed above, provide coatings having exceptionally good adhesion and resistance to corrosion. For solvent based coatings to be applied by spray application methods, the diene functional aminoepoxy resin and the dieneophile functional aminoepoxy resin each preferably is of number average molecular weight about 1000–3000. It will be within the ability of those skilled in the art to determine a suitable solvent and amount of same for a given coating composition of the invention, for a given application. It will be understood that any solvent allowed to remain in the cured coating should be inert to avoid adverse effects upon the cured coating or upon another coating used in conjunction with it, during the curing process or thereafter. Preferably the cured coating is substantially free of solvent. Sufficient solvent is used to reduce the viscosity of the coating composition to a level suitable for application to the substrate in the desired manner. Thus, for example, for a composition to be used as a spray-applied primer coating composition, it is preferred that sufficient solvent be used to reduce the viscosity of the coating composition to about 25–35 seconds, No. 4 Ford Cup at 27° C. (80° F.).

Solvent based coating compositions according to the invention are cured by heating same to a sufficient temperature for a sufficient time to drive off the solvent, to de-block the dieneophile functionality (if blocked), and to cause reaction of the diene functionality with the dieneophile functionality. Thus, for example, a solvent based coating composition according to preferred embodiments described above, applied by spray techniques to the surface of a motor vehicle body panel as a primer coat would be cured by heating to a temperature above about 130° C. more preferably about 135°–180° C. for approximately 15–30 minutes.

Water Based Coating Compositions

Thermosetting compositions comprising the diene functional aminoepoxy resin of the invention along with dieneophile functional resin as described above, are especially advantageous for use in a water based coating composition. It has been found that such coating compositions comprising the two co-reactive aminoepoxy resins modified with the hydroxy functional secondary amine modifying agent and the butadiene acrylonitrile copolymer second modifying agent are more easily dispersed into aqueous solvent and provide more stable aqueous dispersions. In addition, electrodeposited coatings of such compositions are found to provide exceptionally good adhesion and resistance to corrosion.

For dispersion into aqueous solvent, the diene functional aminoepoxy resin and the dieneophile functional aminoepoxy resin are at least partially neutralized by acid, preferably weak organic acid such as formic acid, acetic acid, which is generally preferred, latic acid, butryric acid or the like or a compatible mixture of any of them. Additional suitable neutralizing acids (often referred to as "solubilizing acid") are known to the skilled of the art and will be apparent in view of the present disclosure. The at least partially neutralized resin is dispersed into water, preferably de-ionized water, for use either in spray application methods, flow coating, etc. or electrodeposition methods. Cured coatings resulting from such methods are found to provide exceptionally good flow characteristics resulting in smooth and otherwise aesthetically superior films having exceptionally good solvent and humidity resistance. The cured coatings were also found to be highly alkali resistant and thus, to provide exceptionally good corrosion protection to the underlying substrate. Water based coating compositions according to the invention can be employed in spray application techniques. Thus, for example, they can be employed as a spray-applied primer coat for automotive vehicle body panels.

According to one most preferred embodiment of the invention, the above described coating compositions can be applied to the surface of a substrate by electrodeposition techniques. According to this embodiment, the crosslinkable coating composition is at least partially, preferably substantially totally, neutralized with solubilizing acid and thereafter dispersed into de-ionized water or water/organic solvent mixture to a concentration of about 5–25 weight percent, more preferably about 10–15 weight percent. The resulting water based composition can be used as a cathodic electrocoat composition. That is, the coating comprising the crosslinkable resin and crosslinking agent, catalysts etc., if any, will deposit upon the workpiece acting as the cathode according to known electrodeposition systems and techniques. For coating compositions adapted for cathodic electrodeposition, the diene functional aminoepoxy resin is preferably of number average molecular weight about 1000–12000, and the blocked dieneophile functional aminoepoxy resin is preferably of number average molecular weight about 1000–9000.

Cathodic electrodeposition according to the present invention is done preferably at voltages of about 1–500 volts, more preferably about 200–400 volts. Subsequent to electrodeposition, the coating on the substrate is heated to above about 130° C., more preferably about 135°–180° C. for a time sufficient to effect the diene/dieneophile reaction and to drive off substantially the entire aqueous solvent content of the coating. In general, it will be within the ability of those skilled in the art to select suitable electrodeposition voltage and baking temperatures and like process parameters in view of the particular application involved.

Such aqueous solvent based coating compositions can comprise a mixture of water and water compatible solvent and diluents such as ethylene glycols and alkylated glycols, for example oxygenated solvents such as Cellosolves and carbitols and the like or a compatible mixture of any of them. For use as spray primers, for example, such water based coating compositions can be formulated with high levels of water, for example, greater than about 10%, such as about 30–50% by weight. Obviously, the particular time and temperatures necesary to effect curing of the coating will depend upon the particular resins employed in the coating compositions and will depend upon the thickness of the coating, the use of catalysts, and like parameters familiar to the skilled of the art.

The invention will be further understood by referring to the following detailed examples. It should be understood that these examples are presented by way of illustration and not by way of limitation. Unless otherwise specified, all references to "parts" are intended to mean parts by weight.

EXAMPLE I

This example illustrates the preparation of a diene functionalized aminoepoxy resin incorporating an alkanolamine modifying agent, a low molecular weight aromatic epoxy resin and a secondary amine terminated butadiene acrylonitrile copolymer resin as a second modifying agent. Thus, 29.4 g (0.3 mole) furfuryl amine is added to a solution of 152 g (0.8 mole epoxide) of Epon 828 (trademark, Shell Chemical Co.; diepoxide) in 158 g of 1:1 mixture of Cellosolve and hexyl Cellosolve at 60° C. After 1½ hours, 19.95 g (0.19 mole) diethanolamine was added and the reaction was allowed to continue for 2 hours at 120° C. Then 36 g (0.01 mole) ATBN 1300 X 16 (trademark, B. F. Goodrich; secondary amine terminated butadiene acrylonitrile copolymer resin) was added and allowed to react for 4 hours at 120° C. The reaction product was then cooled to room temperature and stored for future use.

EXAMPLE II

This example illustrates the preparation of a monoprimary amine functional blocked dieneophile. Accordingly, 3,6-endoxo-1,2,3,6-tetrahydrophthalic anhydride was first prepared by combining 68 g (1 mole) furan with 98 g (1 mole) maleic anhydride in 166 g methyl ethyl ketone. The initially clear solution was stirred at room temperature; a mild exotherm and the formation of a white solid was observed. After stirring at room temperature for 4–6 hours, the solids were isolated by filtration, washed with cold methyl ethyl ketone and dried. To form the mono-primary amine functional blocked dieneophile, 166 g (1 mole) of 3,6-endoxo-1,2,3,6-tetrahydrophthalic anhydride was added to a solution of 170 g (1 mole) isophorone diamine in 300 g dimethoxy ethane (DME). During the initial addition, the anhydride dissolved in the reaction medium and a slight exotherm was noted. Within 4–6 hours, the precipitation of the monoprimary amine functional blocked dieneophile had occurred resulting in the formation of a fine white, water soluble solid after a thorough rinse with DME. The product was stored for future use.

EXAMPLE III

This example illustrates the preparation of blocked dieneophile functional aminoepoxy resin suitable for use with the diene functional aminoepoxy resin of Example I. This dieneophile resin incorporates a low molecular weight epoxy resin, diethanolamine modifying agent and secondary amine terminated butadiene acrylonitrile copolymer modifying agent. A mixture of 70 g (0.2 mole) of the monoprimary amine functional blocked dieneophile prepared in Example II is combined with 138 g ( 0.7 moles epoxide) Epon 828 and 30.45 (0.29 moles) diethanolamine in 21 g water and 80 g butanol. The reaction mixture is heated at 80° C. for 4 hours. Then 36 g ATBN - 1300 X 16 (trademark, B. F. Goodrich Chemical Co.) is added and the reaction is allowed to continue for 6 hours at 80° C. The reaction product is cooled and stored.

EXAMPLE IV

This example illustrates the preparation of an unpigmented electrocoat bath formulation. Accordingly, 64.3 g of of diene functionalized amine epoxy resin prepared according to Example I is combined with 39 g of the dieneophile functionalized aminoepoxy resin of Example III and 6 g glacial acetic acid. The resulting mixture was heated to 40°–50° C. and 363 g deionized water is added gradually with rapid mixing with a dispersator. After all water had been added, the resulting translucent dispersion was cooled and mixed overnight at room temperature. The resulting dispersion was filtered, and electrodeposited on steel panels at 150–200 volts. The deposited panels, after being baked at 180° C. for 30 minutes provide smooth coatings which show good corrosion resistance.

EXAMPLE V

This example illustrates the preparation of a pigmented electrocoat bath formulation. This preparation involves a two-part process.

Part A—Mill Base

Materials 35 g diene functional aminoepoxy resin of Example I
21 g aluminum silicate
6 g white lead
3 g carbon black
35 g 1,2-dimethoxy ethane The above materials are combined and the pigments are dispersed to a Hegman Gage reading of greater than 7 by grinding with metal shot.

Part B—Dispersion/Primer Preparation

Materials 58 g diene functional aminoepoxy resin of Example I
50 g dieneophile functional aminoepoxy resin of Example III
72 g Mill Base (Part A)
9.86 g glacial acetic acid
522.7 g deionized water The above materials, except for the water, are mixed together thoroughly and heated to 50°–60° C. The water is then added slowly while mixing with a dispersator. After all the water is added, the dispersion is cooled to room temperature and mixed overnight. The resoluting electrocoat bath is filtered and electrodeposited on steel panels at 150–200 volts. The deposited panels are baked at 180° C. for 30 minutes to provide a coating showing good corrosion resistance.

EXAMPLE VI

This example illustrates the use of mixed epoxy resins for the preparation of diene functional aminoepoxy resin according to the invention. Thus, the procedure of Example I is followed using the following materials:
100 g Epon 1001 (trademark, Shell Chemical Co.; diepoxide)
38 g Epon 828 (trademark, Shell Chemical Co.; diepoxide)
29.4 g Furfuryl amine
19.95 g Diethanol amine
36.09 g ATBN 1300 X 16 (trademark, B. F. Goodrich Chemical Co.)
79.0 g Cellosolve
79.0 g hexyl Cellosolve
The resulting resin is cooled and stored.

EXAMPLE VII

This example illustrates the use of a straight chain aliphatic diamine in the preparation of blocked dieneophile functional aminoepoxy resin suitable for use with diene functional modified aminoepoxy resin of the invention. Thus, the procedure of Example II is repeated using 116 g (1 mole) 1,6-hexadiamine instead of isophorone diamine. The resulting product is used in the procedure of Example III in place of the product of Example II. The product is blocked dieneophile functional aminoepoxy resin suitable for use in thermosetting compositions with the diene functional resins of the invention.

EXAMPLE VIII

This example illustrates the use of unsaturated lactones in the preparation of a monoprimary amine functional blocked dieneophile. Thus, the procedure of Example II is repeated except that one mole (98 g) of a-angelicalactone (4-hydroxy-3-pentenoic acid γ-lacone) is used in place of maleic anhydride. The resulting product is used in the procedure of Example III in place of the product of Example II. The product is blocked dieneophile functional aminoepoxy resin suitable for use in thermosetting compositions with diene functional resins of the invention.

EXAMPLE IX

This example illustrates the preparation of solvent based coating formulations according to the invention.

Part A—Mill Base

Materials 35 g diene functionalized aminoepoxy resin of Example I
21 g aluminum silicate
6 g white lead
3 g carbon black
35 g Cellosolve The above materials were combined and the pigments were dispersed to a Hegman Gage reading of greater than 7 by grinding with metal shot. The mill base is then incorporated into coating formulation by thorough mixing with:

Materials 58 g diene functional aminoepoxy resin of Example I
50 g blocked dieneophile functional aminoepoxy resin of Example III
36 g mill base (Part A)
250 g xylene:ethoxy ethanol (1:1)
The resulting solvent based composition can be applied to a substrate to produce a heat-curable coating theron.

EXAMPLE X

This example illustrates the preparation of blocked dieneophile functional aminoepoxy resin incorporating a low molecular weight epoxy resin and diethanolamine modifying agent. A mixture of 70 g (0.2 mole) of the monoprimary amine functional blocked dieneophile prepared in Example II was combined with 138 g (0.7 moles epoxide) Epon 828 (trademark, Shell Chemical Co.; diepoxide) and 31 g (0.3 moles) diethanol amine in 21 g water and 50 g butanol. The reaction mixture was heated at 80°–90° C. until no epoxide functionality was detected by infrared spectoscopy. The reaction product was cooled and stored.

EXAMPLE XI

This example illustrates the preparation of an unpigmented electrocoat bath formulation. Accordingly, 64.3 g of diene functionalized aminoepoxy resin prepared according to Example I is combined with 39 g of the dieneophile functionalized aminoepoxy resin of Example X and 6 g glacial acetic acid. The resulting mixture is heated to 40°–50° C. and 363 g de-ionized water is added gradually with rapid mixing with a dispersator. After all the water has been added, the resulting translucent dispersion is cooled and mixed overnight at room temperature. The resulting dispersion is filtered, and electrodeposited on steel panels at 150-200 volts. The coated panels are baked at 100° C. for 30 minutes to provide smooth coatings which show good corrosion resistance.

In view of this disclosure, many modifications of the invention will be apparent to those skilled in the art. It is intended that all such apparent modifications fall within the true scope of this invention and be included within the terms of the appended claims.

INDUSTRIAL APPLICABILITY

It will be apparent from the foregoing that this invention has industrial applicability as a coating composition, especially as a cathodic electrodeposition primer coating composition for sheet steel and the like used in automotive vehicles, household appliances and the like, and other applications where the coating composition desirably has excellent storage stability and the cured coating desirably provides excellent humidity and solvent resistance to protect the substrate against corrosion, wear and the like.

We claim:

1. A substantially gel-free diene functional modified aminoepoxy resin of number average molecular weight (Mn) about 1000-18,000, comprising the reaction product of (i) diepoxide reactant, (ii) amine functional conjugated diene chain extending reactant selected from the group consisting of di-secondary amine functional bisdiene, mono-primary amine functional diene, and a mixture of any of them, (iii) modifying agent comprising hydroxy functional secondary amine, and (iv) second modifying agent selected from the group consisting of secondary amine terminated. butadiene acrylonitrile copolymer resin, carboxy terminated butadiene acrylonitrile copolymer resin, and any mixture thereof, said second modifying agent having number average molecular weight about 1400-4400 and amine or carboxy, respectively, equivalent weight of about 700-2200.

2. The diene functional modified aminoepoxy resin of claim 1, wherein the molar equivalent ratio of modifying agent secondary amine functionality to diepoxide reactant epoxy functionality is from about 0.1:1 to about 0.2:1, respectively.

3. The diene functional modified aminoepoxy resin of claim 1, wherein said second modifying agent contributes about 1-30 percent by weight of said diene functional modified aminoepoxy resin.

4. The diene functional modified aminoepoxy resin of claim 1, wherein the molar equivalent ratio of modifying agent secondary amine functionality to diepoxide reactant epoxy functionality is from about 0.1:1 to about 0.2:1, respectively, and said second modifying agent contributes about 1-30 weight percent of said diene functional aminoepoxy resin.

5. The diene functional modified aminoepoxy resin of claim 1, wherein said modifying agent is selected from the group consisting of alkylalkanolamine, dialkanolamine, N-alkanolaniline, and a mixture of any of them, wherein each alkyl and alkanol moiety has from one to about ten carbons.

6. The diene functional modified aminoepoxy resin of claim 1, wherein said modifying agent consists essentially of diethanolamine.

7. The diene functional modified aminoepoxy resin of claim 1, wherein said diepoxide reactant is selected from the group consisting of Bisphenol A-epichlorohydrin epoxy resin, Novolak epoxy resin, aliphatic epoxy resin and a compatible mixture of any of them.

8. The diene functional modified aminoepoxy resin of claim 1, wherein said amine functional diene reactant consists essentially of mono-primary amine functional diene.

9. The diene functional modified aminoepoxy resin of claim 8, wherein said amine functional diene reactant is selected from those of the general formula:

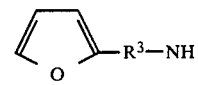

wherein $R^3$ is a divalent organic linking moiety containing no ester groups and no functionality substantially reactive with the diepoxide reactant.

10. The diene functional modified aminoepoxy resin of claim 8, wherein said amine functional diene reactant is selected from the group consisting of furfuryl amine, 2-aminomethyl-1,3-butadiene, and a mixture thereof.

11. The diene functional modified aminoepoxy resin of claim 1, wherein a portion of the epoxy functionality of said diepoxide reactant is reacted with end-capping reactant bearing a single functionality substantially reactive with epoxy functionality.

12. The diene functional modified aminoepoxy resin of claim 11, wherein said end-capping reactant is selected from those having the general formula:

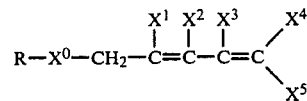

wherein:
R is a monohydroxy functional hydrocarbon moiety or a mono-amine functional hydrocarbon moiety, and

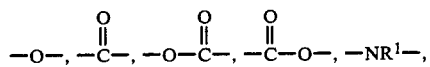

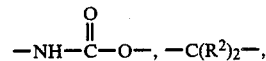

or the like, wherein $R^1$ is hydrogen, straight, branched or cyclo alkyl, aryl, or arylalkyl, and each $R^2$ is the same or different and is selected from hydrogen, straight, branched or cyclo alkyl, aryl, or arylalkyl, and $X^1$, $X^2$, $X^3$, $X^4$ and $X^5$ are the same or different and each is hydrogen, straight, branched or cyclo alkyl, aryl, or arylakyl, or $X^1$ and $X^5$ together are alkylene, —O—, or —$NR^1$— wherein $R^1$ is as defined above.

13. The diene functional modified aminoepoxy resin of claim 11, wherein said end-capping reactant is selected from the group consisting of monohydroxy functional conjugated dienes of number average molecular weight about 70-300, and mixtures thereof.

14. The diene functional modified aminoepoxy resin of claim 11, wherein said monofunctional end-capping reactant is selected from the group consisting of mono-secondary amine functional diene, monohydroxy functional diene, and a compatible mixture of any of them.

15. The diene functional modified aminoepoxy resin of claim 11, wherein said monofunctional end-capping reactant is selected from the group consisting of furfuryl alcohol, 2-hydroxymethyl-1,3-butadiene, and a mixture thereof.

16. The diene functional modified aminoepoxy resin of claim 1, wherein said second modifying agent has number average molecular weight of about 3400–3600 and amine or carboxy, respectively, equivalent weight of about 800–1200.

17. The diene functional modified aminoepoxy resin of claim 1, wherein said second modifying agent comprises the polymerization reaction product of acrylonitrile monomer with butadiene monomer, said acrylonitrile reacting in sufficient amount to contribute about 10–27 percent by weight of said second modifying agent.

18. A substantially gel-free diene functional modified aminoepoxy resin of number average molecular weight about 1000–3000, comprising the reaction product of (1) second modifying agent consisting of secondary amine terminated butadiene acrylonitrile copolymer resin of number average molecular weight about 1400–4400 and amine equivalent weight about 700–2200, with (2) the reaction product of a molar equivalent excess of diepoxide reactant consisting essentially of Bisphenol A-epichlorohydrin diepoxide resin with (a) amine functional diene chain extending reactant selected from the group consisting of furfuryl amine, 2-aminomethyl-1,3-butadiene, and a mixture thereof, (b) monofunctional end-capping reactant selected from the group consisting of furfuryl alcohol, 2-hydroxymethyl-1,3- butadiene and a mixture thereof, and (c) modifying agent consisting of $C_2$–$C_5$ dialkanolamine.

19. A substantially gel-free diene functional modified aminoepoxy resin of number average molecular weight about 1000–12,000, at least partially neutralized with solubilizing acid selected from the group consisting of acetic acid, lactic acid, formic acid, butyric acid, and a compatible mixture of any of them, comprising the reaction product of (1) second modifying agent consisting of secondary amine terminated butadiene acrylonitrile copolymer resin of number average molecular weight about 1400–4400 and amine equivalent weight about 700–2200, with (2) the reaction product of a molar equivalent excess of diepoxide reactant consisting essentially of Bisphenol A-epichlorohydrin diepoxide resin with (a) amine functional diene chain extending reactant selected from the group consisting of furfuryl amine, 2-aminomethyl-1,3-butadiene, and a mixture thereof, (b) optionally, end-capping reactant selected from the group consisting of furfuryl alcohol, 2-aminomethyl-1,3-butadiene, and a mixture thereof, and (c) modifying agent consisting of $C_2$–$C_5$ dialkanolamine.

* * * * *